(12) United States Patent
Kärkkäinen et al.

(10) Patent No.: US 12,481,770 B2
(45) Date of Patent: *Nov. 25, 2025

(54) SYSTEM AND METHOD FOR PROVIDING PROTECTED DATA STORAGE IN DATA MEMORY

(71) Applicant: Gurulogic Microsystems Oy, Turku (FI)

(72) Inventors: Tuomas Kärkkäinen, Turku (FI); Jouni Laine, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,228

(22) Filed: Sep. 1, 2023

(65) Prior Publication Data

US 2024/0184900 A1 Jun. 6, 2024

Related U.S. Application Data

(63) Continuation-in-part of application No. 17/270,967, filed as application No. PCT/EP2019/073247 on Aug. 30, 2019, now Pat. No. 11,783,094.

(30) Foreign Application Priority Data

Aug. 31, 2018 (GB) ...................................... 1814149

(51) Int. Cl.
*G06F 21/60* (2013.01)
*G06F 21/62* (2013.01)

(52) U.S. Cl.
CPC ........ *G06F 21/602* (2013.01); *G06F 21/6218* (2013.01)

(58) Field of Classification Search
CPC ............................ G06F 21/602; G06F 21/6218
See application file for complete search history.

(56) References Cited

U.S. PATENT DOCUMENTS

| 8,812,875 B1 | 8/2014 | Melvin |
| 2002/0129245 A1 | 9/2002 | Cassagnol et al. |
| 2004/0032950 A1 | 2/2004 | Graunke |

FOREIGN PATENT DOCUMENTS

| EP | 2674891 A1 | 12/2013 |
| GB | 2136175 B | 4/1986 |

(Continued)

OTHER PUBLICATIONS

GB Intellectual Property Office, Combined Search and Examination Report under Sections 17 and 18(3), Application No. GB1814149.9, mailed Feb. 28, 2019, 9 pages.

(Continued)

*Primary Examiner* — Ayoub Alata
(74) *Attorney, Agent, or Firm* — ZIEGLER IP LAW GROUP, LLC.

(57) ABSTRACT

A system for providing protected data storage in a data memory of a computing device has an encoder and a decoder. The encoder encrypts unencrypted data using encryption information to generate encrypted data, and stores the encrypted data and the encryption information in an allocated portion of the data memory. The decoder accesses the encrypted data and the encryption information from the allocated portion of the data memory, and decrypts the encrypted data using the encryption information to re-generate the unencrypted data. Each time the unencrypted data is read from the allocated portion of the data memory or the unencrypted data is to be written to the allocated portion of the data memory, the encoder re-encrypts the unencrypted data using newer encryption information to generate newer encrypted data, and replaces previous encrypted data and previous encryption information with the newer encrypted data and the newer encryption information, respectively, in the allocated portion of the data memory.

(Continued)

The encoder and the decoder are integrated, so as to operate in a single thread of execution.

16 Claims, 3 Drawing Sheets

(56) References Cited

FOREIGN PATENT DOCUMENTS

| IE | S20070421 A2 | 12/2007 |
|---|---|---|
| WO | 9726736 A1 | 7/1997 |
| WO | 2007144388 A1 | 12/2007 |

OTHER PUBLICATIONS

GB Intellectual Property Office, Examination Report under Section 18(3), Application No. GB1814149.9, mailed Jul. 3, 2020, 4 pages.
GB Intellectual Property Office, Intention to Grant under Section 18(4), Application No. GB1814149.9, mailed Oct. 23, 2020, 2 pages.
International Preliminary Report on Patentability, Application No. PCT/EP2019/073247, mailed Nov. 12, 2020, 10 pages.
International Search Report, Application No. PCT/EP2019/073247, mailed Dec. 2, 2019, 2 pages.

SYSTEM AND METHOD FOR PROVIDING PROTECTED DATA STORAGE IN DATA MEMORY

TECHNICAL FIELD

The present disclosure relates to systems for providing protected data storage in data memories of computing devices. Moreover, the present disclosure is concerned with methods for providing protected data storage in data memories of computing devices. Furthermore, the present disclosure concerns computer program products comprising non-transitory computer-readable storage media having computer-readable instructions stored thereon, the computer-readable instructions being executable by a computerized device comprising processing hardware to execute the aforesaid methods.

BACKGROUND

Contemporary computer-related products (for example, such as processing hardware, operating systems and so forth) beneficially conform to data security standards. As an example, for a given processing hardware, it is desired that the given processing hardware has an isolated or trusted environment, where all sensitive data can be processed securely. Providing such an isolated or trusted environment often increases a cost of manufacturing a given computer-related product.

Moreover, it is contemporarily expected that, in many situations, service providers (providing various services to their consumers) execute their duty of care in respect of data right protection of the consumers, and fulfil relevant legal requirements.

Conventionally, hardware vendors have provided a Trusted Execution Environment (TEE), which guarantees "in theory" protection for execution code and sensitive data inside isolated hardware. Moreover, contemporary operating systems (OS) employ a memory protection technique, which prevents a process from accessing a portion of memory that has not been allocated to it.

Furthermore, some conventional techniques encrypt the data prior to storage in the memory. Such data encryption typically utilizes a fixed encryption key that is selected by a user or by a software application.

However, these conventional techniques for protecting sensitive data suffer from several disadvantages. Firstly, runtime memory is isolated from protected memory by hardware or an operating system (OS). Secondly, the protected memory is static during non-modified memory usage. Thirdly, one cannot trust protection techniques provided by device manufacturers (for example, such as TEE), as security implementations of such protection techniques are not transparent to their users. Fourthly, the conventional techniques are vulnerable to memory attacks, for example, such as "Meltdown" and "Spectre", which are critical vulnerabilities in modern processing hardware. Fifthly, vulnerabilities existing in the modern processing hardware cannot be fixed easily, namely without changing their overall design. Sixthly, memory operations employed at the OS level (to safeguard against the aforementioned vulnerabilities) reduce computing performance severely. Seventhly, one cannot trust protection techniques provided by the operating systems (OS), as their security implementations are typically based on information systems that are comprehensive and intact only in theory; notably, new vulnerabilities are being found from interfaces of such information systems every now and then.

In light of the foregoing, there arises a contemporary need for an improved system for providing protected data storage in a data memory of a computing device, such that the protected data storage is not vulnerable to memory attacks.

In a published United States patent document US 2002/0129245 A1 (Robert Cassagnol et al.; "Apparatus for Providing a Secure Processing Environment"), there is described an apparatus for providing a secure processing environment. The apparatus includes a read/write memory for storing encrypted information, a processor, a cipherer and an authenticator. The cipherer receives encrypted information from the read/write memory and decrypts the encrypted information into decrypted information to be returned to the memory for subsequent use by the processor. The authenticator authenticates the decrypted information prior to use by the processor and re-authenticates the information prior to re-encryption by the cipherer. Upon re-authentication, the information is re-encrypted and the re-encrypted information is stored in an external memory along with previous encrypted information.

In a published United Kingdom patent document GB2136175A (Atalla Corporation; "File Access Security Method and Means"), there is described an apparatus for accessing files. The apparatus accesses a data file stored in encrypted form using one encryption key and re-stores the data file re-encrypted using another encryption key. The apparatus produces a record of each access and re-encryption to control usage of encryption keys for access and re-entry of the encrypted data file and to audit a record of users that had access to the data file.

In a published United States patent document U.S. Pat. No. 8,812,875B1 (Stephen Melvin; "Virtual self-destruction of stored information"), there is described a method and apparatus which are utilized to conveniently and swiftly render stored information inaccessible. Sensitive information is stored in an encrypted form and by eliminating the key or keys which are needed for decryption, the stored information becomes virtually destroyed. A variety of mechanisms and policies can be used to manage, set and eliminate decryption keys. In some cases decryption keys can be stored in volatile storage elements so that by merely interrupting power to the storage element, the decryption keys are eliminated. In this way, a manually controlled mechanism can be used to allow a user to accomplish a "self-destruct" of the stored information instantly without the need for the operation of any processor and without the need to change any stored information.

In a published EP patent document EP2674891 A1 (Thomson Licensing SAS; "A method, a device and a computer program support for execution of encrypted computer code"), there is described a device which stores program code in a plurality of slots in its memory. When a processor of the device receives a call to an encrypted function, uses a slot table to find the location of the cipher function and the cipher module and the key to decrypt the encrypted module. The encrypted module is decrypted, executed, re-encrypted and moved to a new memory slot. The cipher function used is moved to a further new slot and the slot table is updated. Also provided is a method and a computer program support. The implementation can make it more difficult to analyse execution traces of the program code.

In a published WIPO patent document WO 2007/144388 A1 (Qtelmedia Group Limited, "A method for restricting access to digital content"), there is described a method for restricting access to digital content. In particular, the implementation relates to a method for restricting access to content such as ring tones and the like for mobile communication devices (MCDs). Content is encrypted using a first encryption key prior to being transmitted from a content host to the MCD. On arrival, the encrypted content is decrypted using an appropriate key corresponding to the first encryption key. As the content is being decrypted, the decrypted content is re-encrypted using another encryption key specific to the MCD. The MCD is able to access the content on their device using a key corresponding to the encryption key specific to the MCD however the content cannot be sent to another MCD in a decrypted format. In this way, content cannot be passed from one MCD to another and used on the second MCD.

In a published US patent document US 2004/032950 A1 (Intel Corp; "Method and apparatus for composable block re-encryption of publicly distributed content"), there is described secure communication from one encryption domain to another using a trusted module. In one embodiment, the implementation includes receiving encrypted streamed content encrypted with a first key, generating a substitution key stream based on the first key and a second key, generating a transposition key stream based on the first and second keys, and simultaneously decrypting and re-encrypting the encrypted streamed content using a combination of the substitution and transposition streams to produce re-encrypted streamed content encrypted with the second key.

SUMMARY

The present disclosure seeks to provide an improved system for providing protected data storage in a data memory of a computing device.

Moreover, the present disclosure seeks to provide an improved method for providing protected data storage in a data memory of a computing device.

A further aim of the present disclosure is to at least partially overcome at least some of the problems of the prior art, as described in the foregoing.

In a first aspect, embodiments of the present disclosure provide a system that, when in operation, provides protected data storage in a first data memory of a computing device, characterized in that the system comprises:

an encoder executing on a processing hardware of the computing device, wherein the encoder, when in operation:
  generates encryption information according to an encryption algorithm,
  encrypts unencrypted data (D1) using the encryption information to generate encrypted data (E2), and
  stores the encrypted data (E2) and the encryption information in an allocated portion of the first data memory and an allocated portion of a second data memory of the computing device, respectively; and
a decoder executing on the processing hardware of the computing device, wherein the decoder, when in operation:
  accesses the encrypted data (E2) and the encryption information from the allocated portion of the first data memory and the allocated portion of the second data memory, respectively, and
  decrypts the encrypted data (E2) using the encryption information to re-generate the unencrypted data (D1);

wherein the encoder, when in operation:
  generates new encryption information according to the encryption algorithm,
  re-encrypts the unencrypted data (D1) using the new encryption information to generate new encrypted data (E3), and
  replaces the encrypted data (E2) and the encryption information with the new encrypted data (E3) and the new encryption information in the allocated portion of the first data memory and the allocated portion of the second data memory, respectively, wherein the unencrypted data (D1) is re-encrypted using newer encryption information to generate newer encrypted data (EN+1) each time the unencrypted data (D1) is read from the allocated portion of the first data memory or the unencrypted data (D1) is to be written to the allocated portion of the first data memory, wherein previous encrypted data (EN) and previous encryption information are to be replaced with the newer encrypted data (EN+1) and the newer encryption information in the allocated portion of the first data memory and the allocated portion of the second data memory, respectively, further wherein the encoder and the decoder are integrated, such that the decoder and the encoder, when in operation, decrypt the previous encrypted data (EN) into the unencrypted data (D1) and re-encrypt the unencrypted data (D1) into the newer encrypted data (EN+1), respectively, in a single thread of execution, and wherein the encoder and the decoder are implemented by way of a low-level code in an inline configuration, such that a cycle of decryption and encryption is not interrupted.

Embodiments of the present disclosure are of advantage in that the system provides more robust protected data storage against different kinds of memory attacks, and is not prone to vulnerabilities of operating systems, target platforms and hardware.

In a second aspect, embodiments of the present disclosure provide a method for providing protected data storage in a first data memory of a computing device, the method being implemented by a system comprising an encoder and a decoder, characterized in that the method comprises:

generating, via the encoder, encryption information according to an encryption algorithm;
encrypting, via the encoder, unencrypted data (D1) using the encryption information to generate encrypted data (E2) and storing the encrypted data (E2) and the encryption information in an allocated portion of the first data memory and an allocated portion of a second data memory of the computing device, respectively;
accessing, via the decoder, the encrypted data (E2) and the encryption information from the allocated portion of the first data memory and the allocated portion of the second data memory, respectively, and decrypting the encrypted data (E2) using the encryption information to re-generate the unencrypted data (D1);
generating, via the encoder, new encryption information according to the encryption algorithm; and
re-encrypting, via the encoder, the unencrypted data (D1) using the new encryption information to generate new encrypted data (E3) and replacing the encrypted data (E2) and the encryption information with the new encrypted data (E3) and the new encryption information in the allocated portion of the first data memory and the allocated portion of the second data memory, respectively, wherein the steps of generating newer encryption information, re-encrypting the unencrypted data (D1) to generate newer encrypted data (EN+1) and replacing previous encrypted data (EN) and previous encryption information with the newer encrypted data (EN+1) and the newer encryption information in the allocated portion of the first data memory and the allocated portion of the second data memory, respectively, are repeated each time the unencrypted data (D1) is read from the allocated portion of the first data memory or the unencrypted data (D1) is to be written to the allocated portion of the first data memory, further wherein the encoder and the decoder are integrated, such that the steps of decrypting the previous encrypted data (EN) into the unencrypted data (D1), re-encrypting the unencrypted data (D1) into the newer encrypted data (EN+1) and replacing the previous encrypted data (EN) and the previous encryption information with the newer encrypted data (EN+1) and the newer encryption information, respectively, are performed in a single thread of execution, and wherein the encoder and the decoder are implemented by way of a low-level code in an inline configuration, such that a cycle of decryption and encryption is not interrupted.

In a third aspect, embodiments of the present disclosure provide a computer program product comprising a non-transitory computer-readable storage medium having computer-readable instructions stored thereon, the computer-readable instructions being executable by a computerized device comprising processing hardware to execute a method pursuant to the aforementioned second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
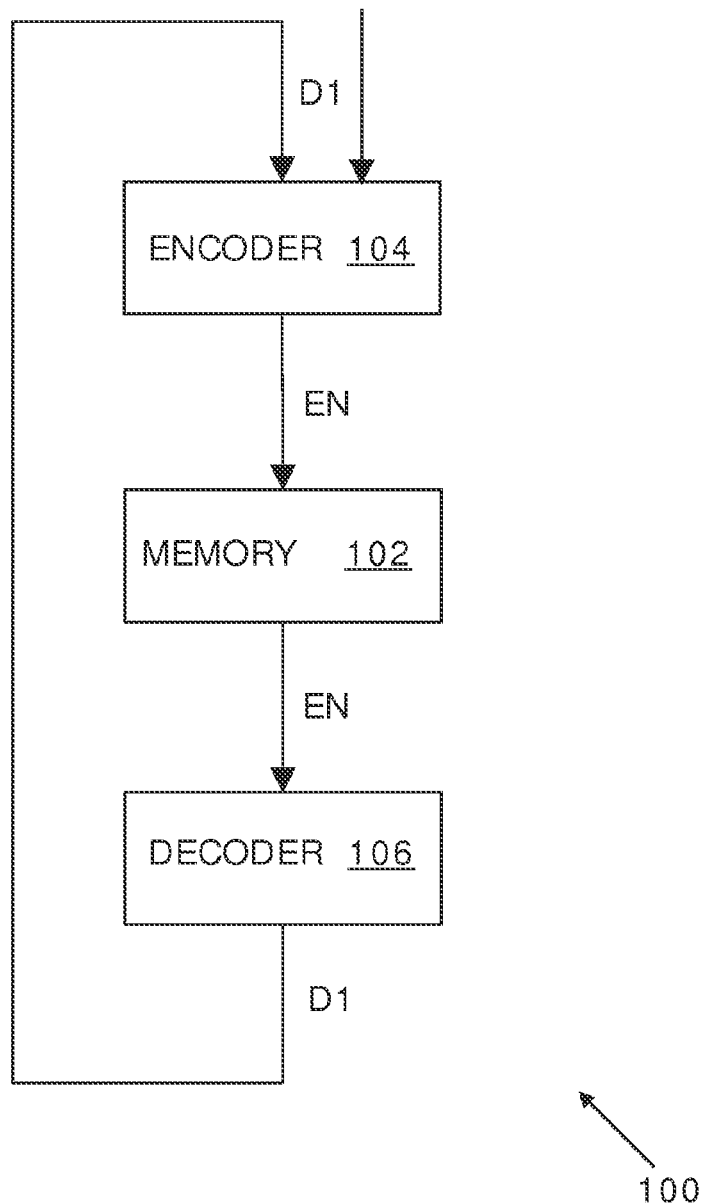
FIGS. 1A and 1B are schematic illustrations of a system for providing protected data storage in a data memory of a computing device, in accordance with different embodiments of the present disclosure.

In the accompanying diagrams, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION OF EMBODIMENTS

In the following detailed description, illustrative embodiments of the present disclosure and ways in which they can be implemented are elucidated. Although some modes of carrying out the present disclosure are described, those skilled in the art would recognize that other embodiments for carrying out or practising the present disclosure are also possible.

In a first aspect, embodiments of the present disclosure provide a system that, when in operation, provides protected data storage in a first data memory of a computing device, characterized in that the system comprises:
  an encoder executing on a processing hardware of the computing device, wherein the encoder, when in operation:
    generates encryption information according to an encryption algorithm,
    encrypts unencrypted data (D1) using the encryption information to generate encrypted data (E2), and
    stores the encrypted data (E2) and the encryption information in an allocated portion of the first data memory and an allocated portion of a second data memory of the computing device, respectively; and
  a decoder executing on the processing hardware of the computing device, wherein the decoder, when in operation:
    accesses the encrypted data (E2) and the encryption information from the allocated portion of the first data memory and the allocated portion of the second data memory, respectively, and
    decrypts the encrypted data (E2) using the encryption information to re-generate the unencrypted data (D1);
wherein the encoder, when in operation:
  generates new encryption information according to the encryption algorithm,
  re-encrypts the unencrypted data (D1) using the new encryption information to generate new encrypted data (E3), and
  replaces the encrypted data (E2) and the encryption information with the new encrypted data (E3) and the new encryption information in the allocated portion of the first data memory and the allocated portion of the second data memory, respectively,
wherein the unencrypted data (D1) is re-encrypted using newer encryption information to generate newer encrypted data (EN+1) each time the unencrypted data (D1) is read from the allocated portion of the first data memory or the unencrypted data (D1) is to be written to the allocated portion of the first data memory, wherein previous encrypted data (EN) and previous encryption information are to be replaced with the newer encrypted data (EN+1) and the newer encryption information in the allocated portion of the first data memory and the allocated portion of the second data memory, respectively,
further wherein the encoder and the decoder are integrated, such that the decoder and the encoder, when in operation, decrypt the previous encrypted data (EN) into the unencrypted data (D1) and re-encrypt the unencrypted data (D1) into the newer encrypted data (EN+1), respectively, in a single thread of execution.

Throughout the present disclosure, the term "thread of execution" generally refers to a smallest sequence of computer-readable instructions that can be executed independently by a scheduler. A thread of execution is a component of a process; herein, the term "process" generally refers to an instance of a computer program that is being executed, namely during a runtime execution of the computer program. While a computer program is merely a passive collection of computer-readable instructions, a process is an actual execution of those instructions. A process may comprise a single thread of execution or multiple threads of execution that execute computer-readable instructions concurrently (namely, for parallel processing). It will be appreciated that in the aforementioned system, decryption and re-encryption instructions are executed as a part of a process, namely within a single thread of execution of the process, wherein the process may have other threads executing their respective instructions. It should be noted that if the same runtime process can execute multiple threads within same data memory page, it is important to verify that the executing thread is the same thread that has allocated first and second data memories, by comparing execution thread ID against thread ID that allocated protected memory; in other words, the current runtime thread ID must be equal to the allocated data memory thread ID.

When executed in the single thread of execution, the aforementioned operations of decrypting the previous encrypted data (EN) into the unencrypted data (D1), re-encrypting the unencrypted data (D1) into the newer encrypted data (EN+1) and replacing the previous encrypted data (EN) and the previous encryption information with the newer encrypted data (EN+1) and the newer encryption information, respectively, are performed in a sequential manner.

It will be appreciated that prior to encrypting the unencrypted data (D1), the data is copied (namely, read) to the first data memory in an unencrypted form. Immediately after copying the unencrypted data (D1) to the first data memory, encryption is performed using dynamically-generated encryption information to generate the encrypted data (E2, E3, EN or EN+1) for storage in the allocated portion of the first data memory. The encrypted data (E2, E3, EN or EN+1) and the dynamically-generated encryption information are then stored in the allocated portion of the first data memory and the allocated portion of the second data memory, respectively, pursuant to embodiments of the present disclosure. Examples of memories are stack memory and heap memory.

Each time the unencrypted data (D1) is required to be read from the allocated portion of the first data memory or the unencrypted data (D1) (whether modified or unmodified) is required to be written to the allocated portion of the first data memory, the decoder, when in operation, decrypts the previous encrypted data (EN) into the unencrypted data (D1). After the aforesaid read or write operation, the encoder, when in operation, re-encrypts the unencrypted data (D1) into the newer encrypted data (EN+1) and replaces the previous encrypted data (EN) and the previous encryption information with the newer encrypted data (EN+1) and the newer encryption information, respectively. As this cycle of decryption and encryption is performed in the single thread of execution pursuant to embodiments of the present disclosure, the encoder and the decoder operate without any interruption (namely, from a beginning to an end) in the single thread of execution. As a result, the data is never stored in the unencrypted form in the first data memory. For illustration purposes only, an example cycle of decryption and encryption has been elucidated in conjunction with FIG. 2.

It will be appreciated that the decryption of the previous encrypted data (EN) and the encryption of the unencrypted data (D1) into the newer encrypted data (EN+1) are processed in a single thread of execution, even when their corresponding encryption information are accessed from and stored at the second data memory that is different from the first data memory. As a result, the cycle of decryption and encryption is never exposed outside the single thread of execution.

The aforementioned system provides a solution that at least partially overcomes at least some of the problems of the prior art, and that is independent of Operating Systems (OS's), target platforms and hardware. Moreover, the system pursuant to embodiments of the present disclosure does not require passwords (or similar) for protection.

Moreover, the aforementioned system, when in operation, functions independently in the single thread of execution, wherein a program utilizing the system is executed in a process; the single thread of execution being a component of said process. In operation, the system does not need to utilize functionalities outside the single thread of execution. As a result, user's sensitive data is protected against interception by malicious third parties.

Furthermore, in operation, the aforementioned system employs an encryption mechanism that involves a self-independent crypto operation that automates a process of regenerating the encryption information, namely cryptographic material. In other words, the encryption information is generated internally and not by external parties, using crypto algorithms which are designed to be resistant for various memory attacks.

In some implementations, the second data memory is same as the first data memory. It will be appreciated that the terms "first" and "second" used herein do not denote any order, quantity or importance, but rather are used to distinguish one element from another.

In other implementations, the second data memory is different from the first data memory. In such an implementation, the encrypted data (E2, E3, EN or EN+1) and its corresponding encryption information are stored at different data memories. Optionally, in this regard, the system utilizes different data memories for storing given encrypted data (EN) and its corresponding encryption information depending on used hardware. This potentially strengthens security of the protected data storage in the first data memory, as a malicious party would have to address and hack protection of the different data memories simultaneously in order to access the sensitive data. This is nearly impossible to achieve, even if the first data memory were penetrated via some vulnerability.

Pursuant to embodiments of the present disclosure, the aforementioned system is suitable for providing protected storage of sensitive data during an execution of a program (for example, a runtime execution of a software application). The encoder of the system, when in operation, re-encrypts the sensitive data using newer encryption information each time the sensitive data is read from or is to be written to the allocated portion of the first data memory. The encoder of the system, when in operation, generates the newer encryption information dynamically. Such a dynamic re-encryption prevents unauthorized access to the sensitive data in an efficient manner. It will be appreciated that as the encoder and the decoder operate in the single thread of execution, accessing the sensitive data or tracking any changes in the sensitive data occurring inside the processing hardware is not possible even for a hardware vendor itself. Thus, the aforementioned system is capable of providing various services and software applications executing on the computing device with an extended protection against malwares, cyber spying, and the like. In this regard, the system is capable of protecting user's sensitive data during the runtime execution even between different hardware and software interfaces.

Throughout the present disclosure, the term "sensitive data" refers to data that is required to be protected from unauthorized access to safeguard the privacy or security of an individual or an organization. Protection of sensitive data may be required for legal or ethical reasons, for issues pertaining to personal privacy, or for proprietary considerations. As an example, the aforementioned system is beneficial to use when creating and handling passwords and Personal Identification Numbers (PIN's), as well as personal identification data, namely personally identifiable information (PII), such that can be efficiently integrated to protected data memory implementation employing digital signature. For example, a person can use password or personal identification number as a signing secret for DSA or PQS algorithms, such as EdDSA or Crystal Dilithium/Sphincs+.

Throughout the present disclosure, the term "data memory" generally refers to a memory that is used for temporarily storing variables and intermediate results used during a runtime execution of one or more programs. The term "data memory" encompasses both volatile and non-volatile data memories of the computing device. Some examples of the first data memory and the second data memory are a Random-Access Memory (RAM) and a Central Processing Unit (CPU) register.

In some implementations, the first data memory can be implemented as a memory provided by a hardware vendor's Trusted Execution Environment (TEE). In this way, the aforementioned system can be integrated into the hardware vendors' TEE. This provides a hardware-backed secure System on a Chip (SoC) that enables truly-verified security services. In such an implementation, the encryption algorithm is hardware-backed by utilizing a TEE supported by the computing device. The TEE has a closed OS that communicates with the main OS of the computing device using a restricted interface memory. As an example, the encryption algorithm can be hardware-backed by utilizing Arm TrustZone or StrongBox Keymaster.

Pursuant to embodiments of the present disclosure, the aforementioned system is suitable for protecting sensitive variables stored in, for example, a RAM, ROM or a CPU register of the computing device during runtime execution of various services or software applications. Such protected sensitive variables are to be used in a manner that is similar to how unprotected variables are used in conventional techniques. As a result, it is not necessary to make changes to a logical development syntax and paradigm of a given program (for example, a software application).

Throughout the present disclosure, the term "variable" generally refers to a storage location in a given data memory that is identified by a memory address, wherein the storage location is referred to by a symbolic name, and contains some known or unknown quantity of information referred to as a "data value". Throughout the present disclosure, the term "protected variable" refers to a variable whose data value is protected by the aforesaid dynamic re-encryption (namely, re-encryption using dynamically-generated encryption information) prior to storage in the first data memory, pursuant to embodiments of the present disclosure.

Pursuant to embodiments of the present disclosure, the protected variable contains the data value in an encrypted form (hereinafter, referred to as the "encrypted data value", for the sake of clarity only). It will be appreciated that storing the data value in the encrypted form (namely, the encrypted data value) provides protection against different kinds of memory attacks, which may try to read or modify the stored data value.

It will be appreciated that a given protected variable is always utilized (namely, for read or write operations during the runtime execution) in the unencrypted form (namely, in a form of plaintext). For this purpose, the aforementioned decoder, when in operation, accesses an encrypted data value of the given protected variable and its corresponding encryption information from the allocated portion of the first data memory and the allocated portion of the second data memory, respectively, and decrypts the encrypted data value using its corresponding encryption information to generate a decrypted, namely an unencrypted data value. This unencrypted data value is then utilized during the runtime execution.

However, after this unencrypted data value is utilized, the aforementioned encoder, when in operation, dynamically generates newer encryption information, re-encrypts the unencrypted data value of the given protected variable using the newer encryption information to generate a newer encrypted data value, and replaces the encrypted data value and its corresponding encryption information (stored previously in the first data memory and the second data memory) with the newer encrypted data value and the newer encryption information, respectively. Beneficially, the aforesaid decryption and re-encryption are performed in the single thread of execution. Next time when the given protected variable is required to be utilized for read or write operations, the aforementioned decoder, when in operation, accesses this newer encrypted data value and this newer encryption information from the allocated portion of the first data memory and the allocated portion of the second data memory, respectively, and decrypts the newer encrypted data value using the newer encryption information to re-generate the unencrypted data value.

This cycle of decryption and encryption is performed for each read or write operation in a single thread of execution, until the given protected variable is no longer required. The cycle of decryption and encryption can be represented as follows:

Step 1: Encrypt an unencrypted data value (using initial encryption information) into an encrypted data value for the first time and store the encrypted data value and the encryption information in the allocated portion of the first data memory and the allocated portion of the second data memory, respectively.

Step 2: Access the encrypted data value and the encryption information from the allocated portion of the first data memory and the allocated portion of the second data memory, respectively, and decrypt the encrypted data value (using the encryption information) to re-generate the unencrypted data value.

Step 3: Utilize the unencrypted data value, as required. If a read operation is performed, the unencrypted data value remains unchanged. If a write operation is performed, the unencrypted data value changes.

Step 4: Encrypt the unencrypted data value (whether changed or unchanged) using dynamically-generated new encryption information into a new encrypted data value and replace the previous encrypted data value and the previous encryption information with the new encrypted data value and the new encryption information, respectively, in the allocated portion of the first data memory and the allocated portion of the second data memory, respectively.

The cycle of the steps 2, 3 and 4 is repeated each time the given protected variable is required to be utilized, and is performed in a single thread of execution. The single thread of execution is not allowed to be suspended until the step 4 is performed (namely, until the unencrypted data value is encrypted into the new encrypted data value and the previous encrypted data value and the previous encryption information are replaced with the new encrypted data value and the new encryption information, respectively). The aforesaid cycle of the steps 2, 3 and 4 has been illustrated in conjunction with FIG. 2.

According to an embodiment, the aforementioned encoder and the aforementioned decoder are susceptible to being implemented by employing custom-designed digital hardware, for example via use of one or more Application-Specific Integrated Circuits (ASIC's), custom-designed integrated circuits and similar. In such a case, the processing hardware of the computing device (on which the encoder and the decoder are executed) includes the custom-designed digital hardware.

Optionally, the system is implemented by employing custom-designed digital hardware that is arranged to operate with hardware associated with controlling the first data memory of the computing device, such as to provide a hybrid form of data memory hardware.

According to another embodiment, the aforementioned encoder and the aforementioned decoder are implemented, at least in part, by way of encoding instructions and decoding instructions, respectively, in a given program that, when executed by the processing hardware of the computing hardware, performs the aforementioned encryption and decryption operations.

In such a case, the aforementioned system, in operation, eliminates direct dependency on RAM security solutions, and is not prone to vulnerabilities of Operating Systems (OS's), target platforms and hardware (for example, such as Meltdown and Spectre vulnerabilities, which are critical vulnerabilities in modern processing hardware).

It will be appreciated that the aforementioned system is susceptible to be implemented in low cost consumer devices (namely, low cost computing devices) without compromising an overall data security. In other words, it is possible to implement the aforementioned system independent of hardware architecture of the computing device.

Optionally, the processing hardware of the computing device (on which the encoder and the decoder are executed) includes at least one Reduced Instruction Set Computing (RISC) processor that is configured to execute the encoding and decoding instructions as elucidated earlier. Such a RISC processor is capable of performing relatively simpler concatenated operations at a very high speed, thereby providing a shorter temporal window of opportunity for hostile attacks to occur.

Examples of the computing device include, but are not limited to, a smartphone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a desktop computer, a consumer electronics apparatus, a wireless communication apparatus, a scientific measuring apparatus, a military communications equipment, and a video-conferencing equipment.

Furthermore, according to an embodiment, the unencrypted data (D1) comprises unencrypted data values of at least one protected variable that are to be utilized during a runtime execution of a program. The at least one protected variable could, for example, comprise one or more sensitive variables used during the runtime execution of the program. In some implementations, the at least one protected variable includes a single protected variable. In other implementations, the at least one protected variable includes a plurality of protected variables.

Optionally, the allocated portion of the first data memory comprises at least one portion of the first data memory that is allocated to the at least one protected variable.

During the runtime execution of the program, read and/or write operations may be performed several times on the at least one protected variable (namely, according to the aforementioned cycle of decryption and encryption). Each time the data (D1) is read or is to be written, newer encryption information is generated dynamically and the data (D1) is re-encrypted using the newer encryption information in a single thread of execution. It will be appreciated that the data (D1) is re-encrypted until last encrypted data (EN+1) is generated using last encryption information before the runtime execution of the program is over.

It is essential from a security perspective that the cycle of decryption and encryption are performed without any interruption. Beneficially, the encoder and the decoder are implemented in an inline configuration (namely, an assembler), such that the processing hardware of the computing device (for example, a central processing unit of the computing device) does not pause (namely, interrupt) an on-going process of the re-encryption of the data (D1). The inline configuration prevents interception by malicious third parties.

In this regard, the steps of generating the newer encryption information, re-encrypting the data (D1) into newer encrypted data (EN+1) using the newer encryption information and replacing previous encrypted data (EN) and previous encryption information with the newer encrypted data (EN+1) and the newer encryption information, respectively, are performed at one go without any hardware interruption, so that there is no time window for interception by malicious third parties. This potentially prevents unauthorized parties from performing a timing attack during the runtime execution of the program.

Optionally, in this regard, the program is implemented by way of a low-level code in the inline configuration, such that the processing hardware of the computing device does not pause (namely, interrupt) an on-going process of the re-encryption of the data (D1) until the code is executed completely.

Additionally, optionally, pointers are used for direct memory access to encrypted data values of the at least one protected variable or processor register. This ensures that the encrypted data values are neither transferred outside nor replicated during the runtime execution of the program (for example, a software application). It will be appreciated that the use of the pointers is more secure as compared to memory copy.

It will also be appreciated that the allocated portion of the first data memory and the allocated portion of the second data memory are allocated dynamically during the runtime execution of the program, namely using dynamic memory allocation. As a precise location of a given allocated portion is not known in advance, a given data memory is accessed indirectly, namely using pointers. In other words, a given pointer is an address to a given dynamically-allocated portion of a given data memory. During the runtime execution of the program, a pointer to the allocated portion of the first data memory enables access to given encrypted data (E2, E3, EN or EN+1), whereas a pointer to the allocated portion of the second data memory enables access to given encryption information.

In this regard, a hardware memory management resource defines memory allocation functions for different types of data memories. For example, to provide protection against memory dumps like previously mentioned "Meltdown" and "Spectre", a guarded heap memory allocation can be efficiently used at least for first data memory. The guarded heap allocation functions are supported in many platforms for storing sensitive data. Such implementation for guarded heap allocation is known and described in Sodium library and it's documentation at secure memory chapter, cf. https://libsodium.gitbook.io/doc/memory_management#guarded-heap-allocations. In the reference implementation of the invention pursuant to the disclosure, the first and second data are allocated to different memories, which has been a sufficiently effective means against most known memory attacks. However, the second data memory can be further efficiently protected by secure environment using for example OS, hardware or application managed memory guard solutions, additionally encrypting heap memory, utilizing stream encryption algorithms such as XSalsa20 and ChaCha20. This type of guarded heap feature prevents system core and memory dumping for the allocated heap memory. Furthermore, it is important to ensure that used memories in same hardware for first and second data (memories?) must provide fast enough runtime execution. This type of implementation for protected data storage in data memories provides good protection against memory attack vulnerabilities caused by malwares such as memory dumps, rollback attacks, residual attacks, other side-channel attacks and also cold boot attacks on direct hardware probing.

It will also be appreciated that reading and writing the encrypted data (E2, E3, EN or EN+1) from and to the allocated portion of the first data memory pursuant to embodiments of the present disclosure are performed in a manner that is similar to reading and writing unencrypted data in conventional techniques. In other words, reading and writing the encrypted data values of the at least one protected variable pursuant to embodiments of the present disclosure is performed in a manner that is similar to reading and writing unencrypted data values of a variable in the conventional techniques.

Moreover, optionally, the encoder, when in operation, initializes the encryption information prior to encrypting the unencrypted data (D1) for the first time. Optionally, in this regard, the encoder, when in operation, generates the encryption information initially (namely, only once) from at least one initialization value. Optionally, the at least one initialization value comprises at least one default value and/or at least one random value of a predefined size. The at least one random value is optionally also encrypted. Optionally, the at least one initialization value is stored in its corresponding allocated portion of the first data memory or the second data memory on a temporary basis.

Optionally, the system further comprises an obfuscation module executing on the processing hardware of the computing device, wherein the obfuscation module, when in operation, obfuscates the at least one initialization value stored in the first data memory or the second data memory prior to releasing its corresponding allocated portion of the first data memory or the second data memory. Such obfuscation may, for example, be performed by way of various types of bit swaps. This ensures that the first data memory or the second data memory (for example, RAM, CPU register or the like) does not store any data reference related to the at least one initialization value that was stored during the memory usage.

Pursuant to embodiments of the present disclosure, the at least one initialization value is used only internally by the aforementioned encoder for generating the encryption information, and is restricted, so that it cannot be accessed or used from outside the aforementioned encoder. In other words, the at least one initialization value is used only internally in the encryption algorithm, in order to generate the encryption information for the first time.

Optionally, the obfuscation module, when in operation, obfuscates the last encrypted data (EN+1) stored in the allocated portion of the first data memory prior to releasing the allocated portion of the first data memory.

Furthermore, in some implementations, the second data memory is same as the first data memory. In such an implementation, the encoder, when in operation, stores given encryption information and given encrypted data (E2, E3, EN or EN+1) in their respective allocated portions of the first data memory. Optionally, in such a case, the obfuscation module, when in operation, obfuscates the last encryption information stored in its allocated portion of the first data memory prior to releasing the allocated portion of the first data memory.

In other implementations, the second data memory is different from the first data memory used to store given encrypted data (E2, E3, EN or EN+1).

Optionally, in such a case, the obfuscation module, when in operation obfuscates the last encryption information stored in the allocated portion of the second data memory prior to releasing the allocated portion of the second data memory.

Moreover, optionally, the encoder, when in operation, generates the encryption information randomly. Optionally, in this regard, the encryption information is generated using an automated function. More optionally, new encryption information is generated independent of old encryption information (namely, previously-used encryption information). This eliminates any possibility of creation of an intentional or un-intentional vulnerability by a software developer.

As mentioned earlier, the encryption information is generated according to the encryption algorithm that is to be used for encrypting the unencrypted data (D1). It will be appreciated that how the encryption information is utilized depends on the encryption algorithm.

Optionally, the encryption algorithm employs symmetric encryption. Optionally, in this regard, the encryption algorithm is a block cipher algorithm (see https://en.wikipedia.org/wiki/Block_cipher), for example, such as Advanced Encryption Standard (AES). Alternatively, optionally, the encryption algorithm is a stream cipher algorithm (see https://en.wikipedia.org/wiki/Stream_cipher), for example, such as ChaCha20 algorithm.

It is well known that the ChaCha20 algorithm is a symmetric encryption algorithm with a randomly-generated encryption key and a random integer 'Nonce'. In an example implementation, when the ChaCha20 algorithm is used, first encryption information can be generated from the randomly-generated encryption key and the random integer 'Nonce', such that the first encryption information has a high entropy. It will be appreciated that in such a case, the randomly-generated encryption key and the random integer 'Nonce' collectively constitute the aforementioned initialization value (namely, the at least one initialization value from which the first encryption information is generated). In the example implementation, subsequent encryption information can be generated using an automated function.

It will be appreciated that the encryption algorithm can alternatively be a suitable asymmetric encryption technique (for example, such as RSA).

According to an embodiment, the encryption information comprises at least one key to be used to encrypt the unencrypted data values of the at least one protected variable to generate the encrypted data values and/or to decrypt the encrypted data values to re-generate the unencrypted data values of the at least one protected variable. In some implementations, the at least one key comprises a single large key. In other implementations, the at least one key comprises a plurality of keys.

According to another embodiment, the encryption information comprises an index of the at least one key to be used to encrypt the unencrypted data values to generate the encrypted data values and/or to decrypt the encrypted data values to re-generate the unencrypted data values. Optionally, in such a case, the at least one key is to be generated by or accessed from a key store using the index. Optionally, the key store is provided to the computing device by a trusted service provider.

Optionally, indices are ordinal numbers of keys in an order of their occurrence within the key store. Optionally, in this regard, the indices are pre-stored in the key store together with their associated keys. Alternatively, optionally, the indices are generated in the key store, and then associated with their respective keys. As an example, the indices may be generated in a consecutive manner corresponding to an order in which the keys are stored in the key store.

Optionally, the key store is protected, and the keys are made accessible for use, internally within the protected key store, to at least one key-store integrated software application, which accesses the keys for use via their indices only. In other words, the keys are not accessible by software applications or ecosystem processes from outside of the key store.

Optionally, the encryption information further comprises a unique identifier of the key store from which the at least one key is to be generated or accessed. This is particularly beneficial when there are a plurality of key stores, and it is important to identify uniquely the key store from which the at least one key is to be generated or accessed.

Optionally, the unique identifier of the key store is a serial number assigned to the key store.

Optionally, the key store is implemented by way of a key container or a key generator that is capable of storing keys and/or generating keys based upon their indices in a reproducible manner. By "reproducible", it is meant that a same key is generated from a given index in a repeatable manner (namely, in a manner that the key generator always produces the same key with the same index). As an example, the key store can be implemented as described in a granted UK patent GB2538052. As another example, the key store can be implemented as described in a granted UK patent GB2556638.

Optionally, the encoder, when in operation, selects the index randomly, and uses the key store to generate the at least one key based upon the selected index.

It should be noted that the aspects of the disclosed embodiments pursuant to the disclosure are capable of being implemented in any type of cloud service or device application which involve handling of sensitive information by means of a key store, browser, server, client etc.

For illustration purposes only, there will now be described an example implementation of the aforementioned system for providing protected data storage of data values of a given protected variable used in an example program (for example, a software application). There will now be considered three stages of a runtime execution of the example program.

Phase A:

Before use, the first data memory must be internally initialized. Typically, the program is written in a manner that the internal initialization is taken care of automatically. For example, when a given developer writes the program, the given protected variable is uninitialized.

Step A1: A required portion (namely, a size) of the first data memory is allocated for storing encrypted data values of the given protected variable. The required portion of the first data memory is optionally equal to a size defined for the given protected variable in the example program. Optionally, the allocated portion of the first data memory is set to a predefined default value of the given protected variable.

It will be appreciated that the size of the allocated portion of the first data memory needs to be equal to or greater than the size defined for the given protected variable. From a technical point of view, it is advantageous when the size of the allocated portion of the first data memory is greater than the size defined for the given protected variable, because, in such a case, the size of the allocated portion does not reveal the size defined for the given protected variable.

Step A2: A required portion (namely, a size) of the second data memory is allocated for storing encryption information. Optionally, the encryption information is generated dynamically for a defined encryption algorithm. More optionally, the encryption information is generated randomly.

Optionally, the encryption information is generated initially from at least one initialization value, as described earlier. In such a case, the at least one initialization value is stored in its corresponding allocated portion of the first data memory or the second data memory, and is obfuscated (for example, by performing various types of bit swaps) before the corresponding allocated portion of the first data memory or the second data memory is released.

Phase B:

After the allocated portion of the first data memory is initialized, the encrypted data values of the given protected variable can be read from or written to the allocated portion of the first data memory.

Optionally, in cases where the size of the allocated portion of the first data memory is greater than the size defined for the given protected variable, memory hopping is utilized. Optionally, in this regard, variable offsets are utilized for locating the encrypted data values of the given protected variable in the allocated portion of the first data memory. In other words, a given encrypted data value is written to a location pointed by a variable offset; the variable offset defines the location in the allocated portion of the first data memory wherefrom the given encrypted data value is to be found.

Moreover, optionally, in cases where the size of the allocated portion of the first data memory is greater than the size defined for the given protected variable, encryption is performed on an entirety of the allocated portion of the first data memory each time read/write operations are performed on the given protected variable.

Step B1: In operation, the aforementioned decoder accesses an encrypted data value of the given protected variable and its corresponding encryption information from the allocated portion of the first data memory and the allocated portion of the second data memory, respectively, and decrypts the encrypted data value (namely, in a form of ciphertext) using its corresponding encryption information to generate a decrypted, namely an unencrypted data value (namely, in a form of plaintext).

If the decryption is performed after the step A2, the encryption algorithm is prepared for encryption and decryption purposes, and the encrypted data value is decrypted into the unencrypted data value using the encryption information generated during initialization.

If the decryption is performed after the step B3, the encryption algorithm is already being used for encryption and decryption purposes, and the encrypted data value is decrypted into the unencrypted data value using newer encryption information that is re-generated dynamically during encoding (namely, encrypting).

Step B2: The unencrypted data value is utilized for read or write operations during the runtime execution of the program. Optionally, in this regard, the unencrypted data value is returned to a calling function of the program during the runtime execution.

Step B3: In operation, the aforementioned encoder re-generates new encryption information, encrypts the unencrypted data value (namely, in a form of plaintext) using the new encryption information to generate a newly-encrypted data value (namely, in a form of ciphertext). The encrypted data value and the encryption information stored previously are then replaced with the newly-encrypted data value and the new encryption information in the allocated portion of the first data memory and the allocated portion of the second data memory, respectively.

It will be appreciated that the encryption information is re-generated dynamically after each encoding iteration; therefore, there is no need to perform time-consuming initialization operations (as performed in the aforementioned step A2) again.

As mentioned earlier, it is essential from the security perspective that a cycle of the aforesaid steps B1, B2 and B3 is performed in a single thread of execution (namely, at one go without any hardware interruption), so that there is no time window for interception by a malicious third party.

Phase C:

When the given protected variable is not required to be used any more in future, the allocated portion of the first data memory is internally finalized. Typically, the program is written in a manner that the internal finalization is taken care of automatically. For example, when a given developer writes the program, the given protected variable is uninitialized and the allocated portion of the first data memory is freed.

Optionally, last encryption information stored in its allocated portion of the second data memory is obfuscated, for example by performing various types of bit swaps, before the allocated portion of the second data memory is released. This ensures that the second data memory (for example, RAM, CPU register or the like) does not store any data reference related to the last encryption information that was stored during the memory usage.

Optionally, a last encrypted data value stored in the allocated portion of the first data memory is obfuscated before the allocated portion of the first data memory is released.

Upon successful completion of the phase C, the allocated portion of the first data memory is internally finalized, and is available for use to other programs.

Furthermore, for illustration purposes only, there will now be considered some example cases indicating how re-generated encrypted information and re-encrypted data are stored each time the data (D1) is read or is to be written to the allocated portion of the first data memory during a runtime execution of a program. In other words, the encryption information of the data to be encrypted always changes when the data is being handled, namely read or written, during the runtime execution of the program.

In these examples, an example protected variable is allocated 32 bytes in the first data memory (hereinafter referred to as a first allocated portion for the sake of convenience only) and encryption information is also allocated 32 bytes in the second data memory (hereinafter referred to as a second allocated portion for the sake of convenience only).

An initial unencrypted data value of the example protected variable (namely, as copied to the first data memory for a first time) can be represented as follows:

84, 0, 101, 0, 115, 0, 116, 0, 105, 0, 110, 0, 103, 0, 0, 0, 133, 136, 38, 156, 203, 59, 74, 241, 229, 48, 145, 79, 145, 121, 110, 77

First encryption information is generated according to an encryption algorithm employed, and is then stored in the second allocated portion of the second data memory. As an example, according to the ChaCha20 encryption algorithm, the first encryption information can be generated from a randomly-generated encryption key and a random integer 'Nonce', such that the first encryption information has a high entropy.

The first encryption information can be represented as follows:

62, 60, 2, 2, 2, 150, 64, 74, 209, 139, 87, 136, 98, 230, 205, 9, 207, 121, 195, 172, 90, 116, 219, 136, 139, 125, 16, 147, 210, 198, 142, 12

The initial unencrypted data value is then encrypted using the first encryption information to generate a first encrypted data value of the example protected variable, wherein the first encrypted data value is stored in the first allocated portion of the first data memory. The first encrypted data value can be represented as follows:

29, 48, 233, 223, 69, 12, 41, 180, 202, 230, 171, 145, 235, 25, 196, 236, 105, 253, 159, 71, 82, 79, 131, 222, 213, 61, 62, 241, 66, 59, 71, 191

Case A: Decrypting the First Encrypted Data Value

The case A concerns the aforementioned step B1, wherein the first encrypted data value of the example protected variable and the first encryption information are accessed from the first allocated portion of the first data memory and the second allocated portion of the second data memory, respectively, and the first encrypted data value is decrypted using the aforementioned first encryption information to re-generate the initial unencrypted data value of the example protected variable as follows:

84, 0, 101, 0, 115, 0, 116, 0, 105, 0, 110, 0, 103, 0, 0, 0, 133, 136, 38, 156, 203, 59, 74, 241, 229, 48, 145, 79, 145, 121, 110, 77

Case B: Modifying the Unencrypted Data Value

The case B concerns the aforementioned step B2, wherein a first byte of the initial unencrypted data value of the example protected variable is changed from '84' to '1'; and the modified unencrypted data value to be written can be represented as follows:

1, 0, 101, 0, 115, 0, 116, 0, 105, 0, 110, 0, 103, 0, 0, 0, 133, 136, 38, 156, 203, 59, 74, 241, 229, 48, 145, 79, 145, 121, 110, 77

Case C: Encrypting the Modified Unencrypted Data Value

The case C concerns the aforementioned step B3, wherein second encryption information is generated dynamically. The second encryption information can be represented as follows:

60, 62, 148, 66, 72, 71, 203, 29, 89, 233, 177, 69, 107, 41, 180, 202, 99, 35, 183, 119, 210, 255, 166, 152, 24, 175, 214, 29, 222, 250, 176, 152

The second encryption information replaces the first encryption information stored previously in the second allocated portion of the second data memory. The second encryption information is used to encrypt the modified unencrypted data value to generate a second encrypted data value for storage in the first allocated portion of the first data memory. The second encrypted data value can be represented as follows:

61, 62, 241, 66, 59, 71, 191, 29, 48, 233, 223, 69, 12, 41, 180, 202, 230, 171, 145, 235, 25, 196, 236, 105, 253, 159, 71, 82, 79, 131, 222, 213

Case D: Reading a Decrypted Data Value for a First Time

In the case D, the second encrypted data value of the example protected variable and the second encryption information are accessed from the first allocated portion and the second allocated portion of the second data memory, respectively, and the second encrypted data value is decrypted using the second encryption information to re-generate the unencrypted data value as follows:

1, 0, 101, 0, 115, 0, 116, 0, 105, 0, 110, 0, 103, 0, 0, 0, 133, 136, 38, 156, 203, 59, 74, 241, 229, 48, 145, 79, 145, 121, 110, 77

Case E: Re-Encrypting the Same Unencrypted Data Value

In the case E, in order to encrypt the same unencrypted data value, third encryption information is generated dynamically; the third encryption information can be represented as follows:

126, 118, 211, 137, 85, 30, 34, 172, 28, 130, 152, 241, 161, 74, 151, 125, 20, 241, 72, 209, 74, 231, 9, 78, 5, 113, 44, 173, 70, 132, 198, 75

The third encryption information replaces the second encryption information stored previously in the second allocated portion of the second data memory. The third encryption information is used to encrypt the same unencrypted data value to generate a third encrypted data value of the example protected variable for storage in the first allocated portion of the first data memory. The third encrypted data value can be represented as follows:

127, 118, 182, 137, 38, 30, 86, 172, 117, 130, 246, 241, 198, 74, 151, 125, 145, 121, 110, 77, 129, 220, 67, 191, 224, 65, 189, 226, 215, 253, 168, 6

Case F: Reading the Decrypted Data Value for a Second Time

In the case F, the third encrypted data value of the example protected variable and the third encryption information are accessed from the first allocated portion of the first data memory and the second allocated portion of the second data memory, respectively, and the third encrypted data value is decrypted using the third encryption information to re-generate the unencrypted data value as follows:

1, 0, 101, 0, 115, 0, 116, 0, 105, 0, 110, 0, 103, 0, 0, 0, 133, 136, 38, 156, 203, 59, 74, 241, 229, 48, 145, 79, 145, 121, 110, 77

Case G: Re-Encrypting the Same Unencrypted Data Value

In the case G, in order to encrypt the same unencrypted data value, fourth encryption information is generated dynamically; the fourth encryption information can be represented as follows:

247, 35, 205, 171, 249, 2, 160, 52, 237, 35, 210, 102, 220, 94, 102, 53, 197, 187, 175, 216, 4, 226, 120, 98, 168, 55, 168, 107, 13, 115, 229, 134

The fourth encryption information replaces the third encryption information stored previously in the second allocated portion of the second data memory. The fourth encryption information is used to encrypt the same unencrypted data value to generate a fourth encrypted data value of the example protected variable for storage in the first allocated portion of the first data memory. The fourth encrypted data value can be represented as follows:

246, 35, 168, 171, 138, 2, 212, 52, 132, 35, 188, 102, 187, 94, 102, 53, 64, 51, 137, 68, 207, 217, 50, 147, 77, 7, 57, 36, 156, 10, 139, 203

It will be appreciated that the aforesaid decryption and encryption operations are performed in a repeating manner, without any interruption, in a single thread of execution during the runtime execution of the program. An example cycle of decryption and encryption has been illustrated in conjunction with FIG. 2.

In the above examples, the encryption information to be stored (namely, replacing any previously-stored encryption information) in the second allocated portion of the second data memory is shown as underlined text for the sake of clarity only. Likewise, the encrypted data value to be stored (namely, replacing any previously-stored encrypted data value) in the first allocated portion of the first data memory is shown as bold text for the sake of clarity only.

In a second aspect, embodiments of the present disclosure provide a method of (namely, a method for) providing protected data storage in a first data memory of a computing device, the method being implemented by a system comprising an encoder and a decoder, characterized in that the method comprises:

generating, via the encoder, encryption information according to an encryption algorithm;

encrypting, via the encoder, unencrypted data (D1) using the encryption information to generate encrypted data (E2) and storing the encrypted data (E2) and the encryption information in an allocated portion of the first data memory and an allocated portion of a second data memory of the computing device, respectively;

accessing, via the decoder, the encrypted data (E2) and the encryption information from the allocated portion of the first data memory and the allocated portion of the second data memory, respectively, and decrypting the encrypted data (E2) using the encryption information to re-generate the unencrypted data (D1);

generating, via the encoder, new encryption information according to the encryption algorithm; and re-encrypting, via the encoder, the unencrypted data (D1) using the new encryption information to generate new encrypted data (E3) and replacing the encrypted data (E2) and the encryption information with the new encrypted data (E3) and the new encryption information in the allocated portion of the first data memory and the allocated portion of the second data memory, respectively, wherein the steps of generating newer encryption information, re-encrypting the unencrypted data (D1) to generate newer encrypted data (EN+1) and replacing previous encrypted data (EN) and previous encryption information with the newer encrypted data (EN+1) and the newer encryption information in the allocated portion of the first data memory and the allocated portion of the second data memory, respectively, are repeated each time the unencrypted data (D1) is read from the allocated portion of the first data memory or the unencrypted data (D1) is to be written to the allocated portion of the first data memory, further wherein the encoder and the decoder are integrated, such that the steps of decrypting the previous encrypted data (EN) into the unencrypted data (D1), re-encrypting the unencrypted data (D1) into the newer encrypted data (EN+1) and replacing the previous encrypted data (EN) and the previous encryption information with the newer encrypted data (EN+1) and the newer encryption information, respectively, are performed in a single thread of execution.

Various embodiments and variants disclosed above apply mutatis mutandis to the method.

Optionally, the method further comprises generating initially (namely, only once), via the encoder, the encryption information from at least one initialization value, as described earlier. Optionally, in such a case, the at least one initialization value is stored in its corresponding allocated portion of the first data memory or the second data memory on a temporary basis.

Optionally, the method further comprises obfuscating the at least one initialization value stored in the first data memory or the second data memory prior to releasing its corresponding allocated portion of the first data memory or the second data memory.

Optionally, the method further comprises obfuscating last encrypted data (EN+1) stored in the allocated portion of the first data memory prior to releasing the allocated portion of the first data memory.

Moreover, in some implementations, the second data memory is same as the first data memory. In such an implementation, given encryption information and given encrypted data (E2, E3, EN or EN+1) are stored in their respective allocated portions of the first data memory. Optionally, in such a case, the method further comprises obfuscating last encryption information stored in its allocated portion of the first data memory prior to releasing the allocated portion of the first data memory.

In other implementations, the second data memory is different from the first data memory used to store given encrypted data (E2, E3, EN or EN+1). Optionally, in such a case, the method further comprises obfuscating the last encryption information stored in the allocated portion of the second data memory prior to releasing the allocated portion of the second data memory.

Optionally, in the method, the unencrypted data (D1) comprises unencrypted data values of at least one protected variable that are to be utilized during a runtime execution of a program.

Optionally, the encryption information comprises at least one key to be used to encrypt the unencrypted data values to generate encrypted data values and/or to decrypt the encrypted data values to re-generate the unencrypted data values.

Alternatively, optionally, the encryption information comprises an index of the at least one key to be used to encrypt the unencrypted data values to generate the encrypted data values and/or to decrypt the encrypted data values to re-generate the unencrypted data values. Optionally, in such a case, the method further comprises generating by or accessing from a key store the at least one key using the index. Optionally, in this regard, the encryption information further comprises a unique identifier of the key store from which the at least one key is to be generated or accessed.

Optionally, in the method, the encryption information is generated randomly.

In a third aspect, embodiments of the present disclosure provide a computer program product comprising a non-transitory computer-readable storage medium having computer-readable instructions stored thereon, the computer-readable instructions being executable by a computerized device comprising processing hardware to execute a method pursuant to the aforementioned second aspect.

Optionally, the computer-readable instructions are downloadable from a software application store, for example, from an "App store" to the computerized device.

Next, embodiments of the present disclosure will be described with reference to FIGS. 1A and 1B.

Figure 1B:
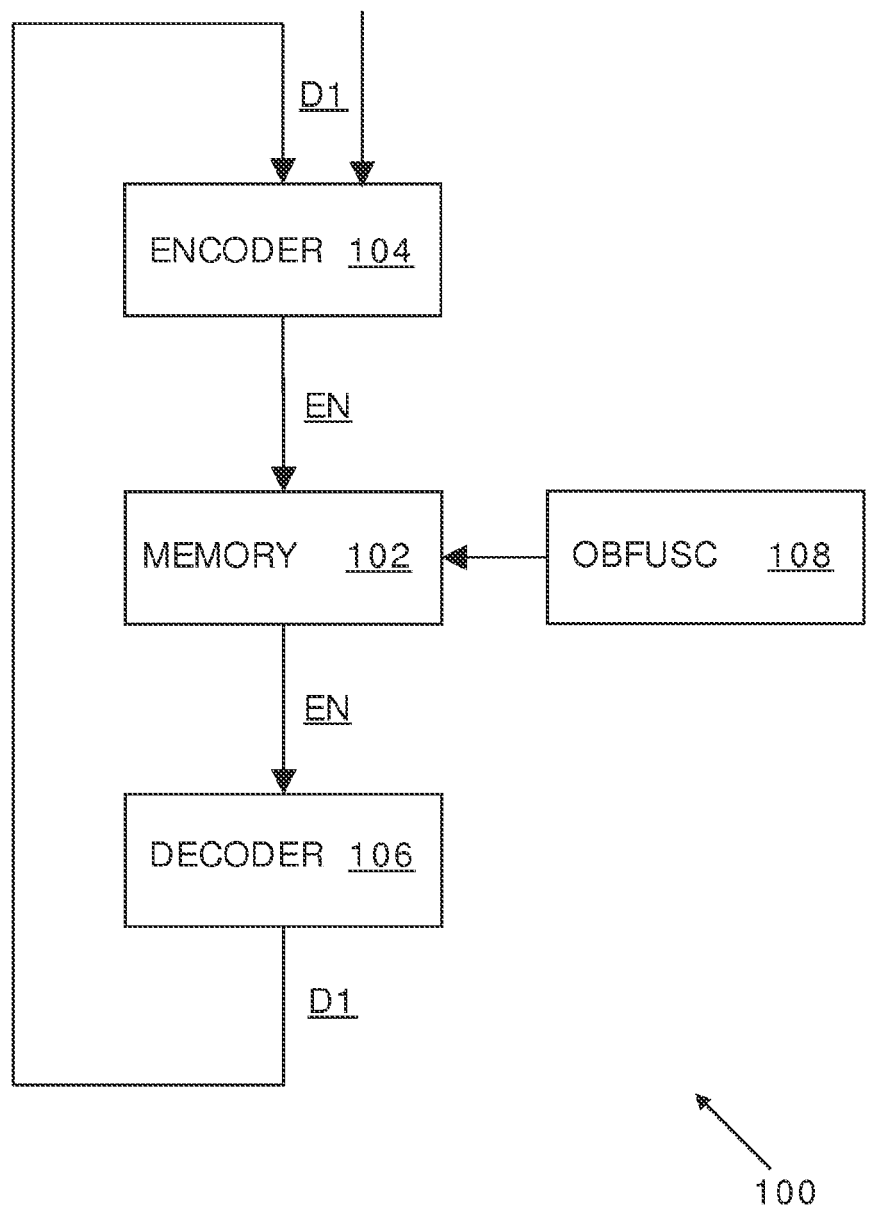

FIGS. 1A and 1B are schematic illustrations of a system 100 for providing protected data storage in a data memory 102 of a computing device, in accordance with different embodiments of the present disclosure. Optionally, the system 100 is implemented as custom-designed digital hardware that is arranged to operate with hardware associated with controlling the data memory 102, such as to provide a hybrid form of data memory hardware.

With reference to FIGS. 1A and 1B, the system 100 comprises an encoder 104 and a decoder 106. The encoder 104, when in operation, generates encryption information according to an encryption algorithm, encrypts unencrypted data (D1) using the encryption information to generate encrypted data (E2) and stores the encrypted data (E2) and the encryption information in a first allocated portion of the data memory 102 and a second allocated portion of the data memory 102 or another data memory of the computing device, respectively. The decoder 106, when in operation, accesses the encrypted data (E2) and the encryption information from the first allocated portion and the second allocated portion, respectively, and decrypts the encrypted data (E2) using the encryption information to re-generate the unencrypted data (D1). Subsequently, the encoder 104, when in operation, generates new encryption information according to the encryption algorithm, re-encrypts the unencrypted data (D1) using the new encryption information to generate new encrypted data (E3) and replaces the encrypted data (E2) with the new encrypted data (E3) and the encryption information with the new encryption information in the first allocated portion and the second allocated portion, respectively.

The decoder 106, when in operation, accesses previous encrypted data (EN) and previous encryption information from the first allocated portion and the second allocated portion, respectively, and decrypts the previous encrypted data (EN) using the previous encryption information to re-generate the unencrypted data (D1). After the unencrypted data (D1) is utilized (namely, for a read or write operation), the encoder 104, when in operation, re-encrypts the unencrypted data (D1) into newer encrypted data (EN+1) using newer encryption information, and replaces the previous encrypted data (EN) and the previous encryption information with the newer encrypted data (EN+1) and the newer encryption information in the first allocated portion and the second allocated portion, respectively.

The encoder 104 and the decoder 106 are integrated, such that the decoder 106 and the encoder 104, when in operation, decrypt the previous encrypted data (EN) into the unencrypted data (D1) and re-encrypt the unencrypted data (D1) into the newer encrypted data (EN+1), respectively, in a single thread of execution.

With reference to FIG. 1B, the system 100 optionally comprises an obfuscation module 108. The obfuscation module 108, when in operation, obfuscates at least one initialization value (used to generate the encryption information initially) stored in its corresponding allocated portion of the data memory 102 (or another data memory of the computing device), prior to releasing the allocated portion of the data memory 102.

FIGS. 1A and 1B are merely examples, which should not unduly limit the scope of the claims herein. A person skilled in the art will recognize many variations, alternatives, and modifications of embodiments of the present disclosure.

Figure 2:
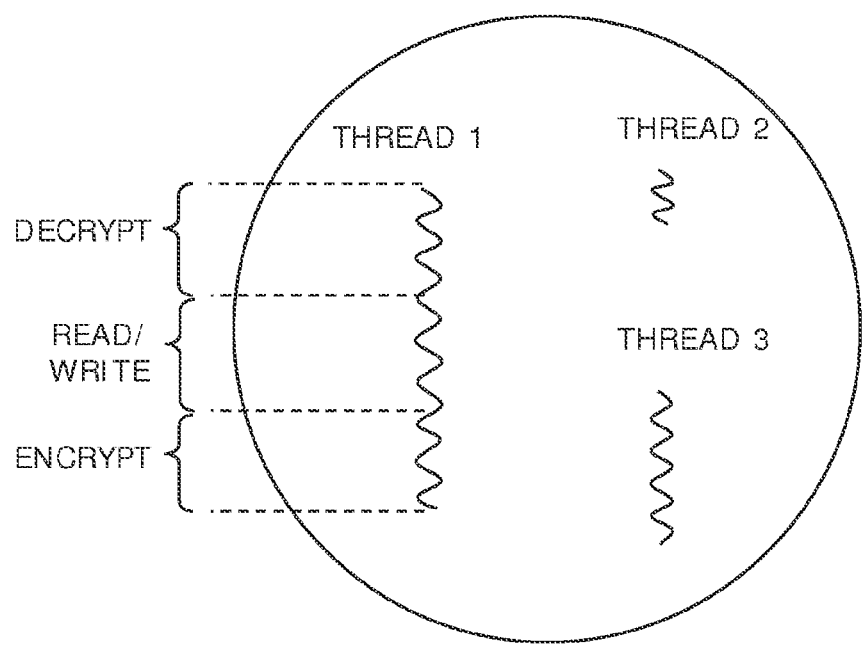
FIG. 2 is a schematic illustration of how a cycle of decryption and encryption is performed in a single thread of execution, pursuant to embodiments of the present disclosure.

FIG. 2 is a schematic illustration of how a cycle of decryption and encryption is performed in a single thread of execution, pursuant to embodiments of the present disclosure.

As shown, the cycle of decryption and encryption is performed in a single thread of execution 'THREAD 1' as follows:

Step 1: Access an encrypted data value of a protected variable and its corresponding encryption information from an allocated portion of a first data memory and an allocated portion of a second data memory, respectively, and decrypt the encrypted data value (using the encryption information) to generate a decrypted data value, namely an unencrypted data value.

Step 2: Utilize the unencrypted data value for a read or write operation.

Step 3: Encrypt the unencrypted data value (whether changed or unchanged) using dynamically-generated new encryption information into a new encrypted data value, and replace the aforesaid encrypted data value and the encryption information with the new encrypted data value and the new encryption information in the allocated portion of the first data memory and the allocated portion of the second data memory, respectively.

The thread 'THREAD 1' is not allowed to be suspended until the step 3 is performed (namely, until the unencrypted data value is encrypted into the new encrypted data value and the previous encrypted data value and the previous encryption information are replaced with the new encrypted data value and the new encryption information, respectively).

With reference to FIG. 2, the thread 'THREAD 1' is a component of a process that has multiple threads, for example, such as threads 'THREAD 2' and 'THREAD 3'. It will be appreciated that the aforesaid cycle of decryption and re-encryption is executed as a part of the process, namely within the thread 'THREAD 1', wherein the process has other threads executing their respective instructions (namely, the threads 'THREAD 2' and 'THREAD 3'). The threads 'THREAD 1', 'THREAD 2' and 'THREAD 3' are executing their respective instructions independently. For example, 'THREAD 1' of the process is shown to execute all its instructions in a sequential manner and is indicative of the execution of the instructions by the system pursuant to embodiments of the present disclosure.

FIG. 2 is merely an example, which should not unduly limit the scope of the claims herein. A person skilled in the art will recognize many variations, alternatives, and modifications of embodiments of the present disclosure. For example, the process may have only one thread of execution, namely the thread 'THREAD 1'.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "one or more" is to be construed in a likewise manner.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

We claim:

1. A system that, when in operation, provides protected data storage in a first data memory of a computing device, wherein the system comprises:—an encoder executing on a processing hardware of the computing device, wherein the encoder, when in operation: —generates encryption information according to an encryption algorithm, —encrypts unencrypted data using the encryption information to generate encrypted data, and—stores the encrypted data and the encryption information in an allocated portion of the first data memory and an allocated portion of a second data memory of the computing device, respectively; and—a decoder executing on the processing hardware of the computing device, wherein the decoder, when in operation: —accesses the encrypted data and the encryption information from the allocated portion of the first data memory and the allocated portion of the second data memory, respectively, and—decrypts the encrypted data using the encryption information to re-generate the unencrypted data; wherein the encoder, when in operation: —generates new encryption information according to the encryption algorithm, —re-encrypts the unencrypted data using the new encryption information to generate new encrypted data, and—replaces the encrypted data and the encryption information with the new encrypted data and the new encryption information in the allocated portion of the first data memory and the allocated portion of the second data memory, respectively, wherein the unencrypted data is re-encrypted using newer encryption information to generate newer encrypted data each time the unencrypted data is read from the allocated portion of the first data memory or the unencrypted data is to be written to the allocated portion of the first data memory, wherein previous encrypted data and previous encryption information are to be replaced with the newer encrypted data and the newer encryption information in the allocated portion of the first data memory and the allocated portion of the second data memory, respectively, and when a size of the allocated portion of the first data memory is greater than a size of a protected variable, newly encrypted data corresponding to the protected variable is stored in the allocated portion of the first data memory based on a variable offset associated with the protected variable, the variable offset identifying a memory location within the allocated portion of the first data memory from which the newly encrypted data is to be retrieved or to be written; further wherein the encoder and the decoder are integrated, such that the decoder and the encoder, when in operation, decrypt the previous encrypted data into the unencrypted data and re-encrypt the unencrypted data into the newer encrypted data, respectively, in a single thread of execution, and wherein the encoder and the decoder are implemented by way of a low-level code in an inline configuration, such that a cycle of decryption and encryption is not interrupted.

2. The system of claim 1, wherein the encoder, when in operation, generates the encryption information initially from at least one initialization value, and the system further comprises an obfuscation module executing on the processing hardware of the computing device, wherein the obfuscation module, when in operation, obfuscates the at least one initialization value stored in its corresponding allocated portion of the first data memory or the second data memory prior to releasing the corresponding allocated portion of the first data memory or the second data memory.

3. The system of claim 1, wherein the second data memory is same as the first data memory.

4. The system of claim 1, wherein the second data memory is different from the first data memory.

5. The system of claim 1, wherein the unencrypted data comprises unencrypted data values of at least one protected variable that are to be utilized during a runtime execution of a program, and the encryption information comprises at least one key to be used to encrypt the unencrypted data values to generate encrypted data values and/or to decrypt the encrypted data values to re-generate the unencrypted data values.

6. The system of claim 1, wherein the unencrypted data comprises unencrypted data values of at least one protected variable that are to be utilized during a runtime execution of a program, and the encryption information comprises an index of at least one key to be used to encrypt the unencrypted data values to generate encrypted data values and/or to decrypt the encrypted data values to re-generate the unencrypted data values, wherein the at least one key is to be generated by or accessed from a key store using the index.

7. The system of claim 6, wherein the encryption information further comprises a unique identifier of the key store from which the at least one key is to be generated or accessed.

8. The system of claim 1, wherein the encoder, when in operation, generates the encryption information randomly.

9. A method for providing protected data storage in a first data memory of a computing device, the method being implemented by a system comprising an encoder and a decoder, wherein the method comprises: —generating, via the encoder, encryption information according to an encryption algorithm; —encrypting, via the encoder, unencrypted data using the encryption information to generate encrypted data and storing the encrypted data and the encryption information in an allocated portion of the first data memory and an allocated portion of a second data memory of the computing device, respectively; —accessing, via the decoder, the encrypted data and the encryption information from the allocated portion of the first data memory and the allocated portion of the second data memory, respectively, and decrypting the encrypted data using the encryption information to re-generate the unencrypted data; —generating, via the encoder, new encryption information according to the encryption algorithm; and—re-encrypting, via the encoder, the unencrypted data using the new encryption information to generate new encrypted data and replacing the encrypted data and the encryption information with the new encrypted data and the new encryption information in the allocated portion of the first data memory and the allocated portion of the second data memory, respectively, wherein the steps of generating newer encryption information, re-encrypting the unencrypted data to generate newer encrypted data and replacing previous encrypted data and previous encryption information with the newer encrypted data and the newer encryption information in the allocated portion of the first data memory and the allocated portion of the second data memory, respectively, are repeated each time the unencrypted data is read from the allocated portion of the first data memory or the unencrypted data is to be written to the allocated portion of the first data memory, and when a size of the allocated portion of the first data memory is greater than a size of a protected variable, storing newly encrypted data corresponding to the protected variable in the allocated portion of the first data memory based on a variable offset associated with the protected variable, the variable offset identifying a memory location within the allocated portion of the first data memory from which the newly encrypted data is to be retrieved or to be written; further wherein the encoder and the decoder are integrated, such that the steps of decrypting the previous encrypted data into the unencrypted data, re-encrypting the unencrypted data into the newer encrypted data and replacing the previous encrypted data and the previous encryption information with the newer encrypted data and the newer encryption information, respectively, are performed in a single thread of execution, and wherein the encoder and the decoder are implemented by way of a low-level code in an inline configuration, such that a cycle of decryption and encryption is not interrupted.

10. The method of claim 9, wherein the method further comprises:
generating initially, via the encoder, the encryption information from at least one initialization value; and
obfuscating the at least one initialization value stored in its corresponding allocated portion of the first data memory or the second data memory prior to releasing the corresponding allocated portion of the first data memory or the second data memory.

11. The method of claim 9, wherein the second data memory is same as the first data memory.

12. The method of claim 9, wherein the second data memory is different from the first data memory.

13. The method of claim 9, wherein the unencrypted data comprises unencrypted data values of at least one protected variable that are to be utilized during a runtime execution of a program, and the encryption information comprises at least one key to be used to encrypt the unencrypted data values to generate encrypted data values and/or to decrypt the encrypted data values to re-generate the unencrypted data values.

14. The method of claim 9, wherein the unencrypted data comprises unencrypted data values of at least one protected variable that are to be utilized during a runtime execution of a program, and the encryption information comprises an index of at least one key to be used to encrypt the unencrypted data values to generate encrypted data values and/or to decrypt the encrypted data values to re-generate the unencrypted data values, wherein the method further comprises generating by or accessing from a key store the at least one key using the index.

15. The method of claim 9, wherein the encryption information is generated randomly.

16. A computer program product comprising a non-transitory computer-readable storage medium having computer-readable instructions stored thereon, the computer-readable instructions being executable by a computerized device comprising processing hardware to execute a method as claimed in claim 9.

* * * * *